Figure 1:
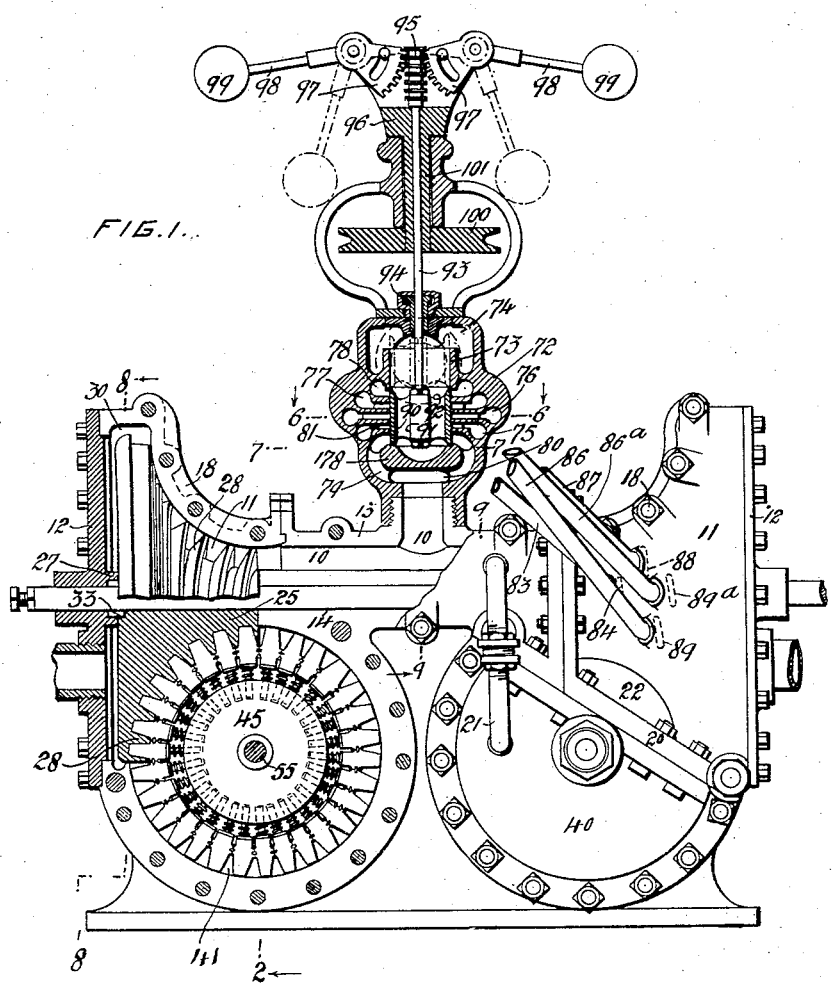

No. 711,083. Patented Oct. 14, 1902.
C. H. TAYLOR.
ROTARY ENGINE.
(Application filed Nov. 14, 1898.)

(No Model.) 6 Sheets—Sheet 1.

Witnesses
R. a. C. Kimber

Inventor
Charles H. Taylor
By his Attorney
John N. Swan

THE NORRIS PETERS CO., PHOTO-LITHO., WASHINGTON, D. C.

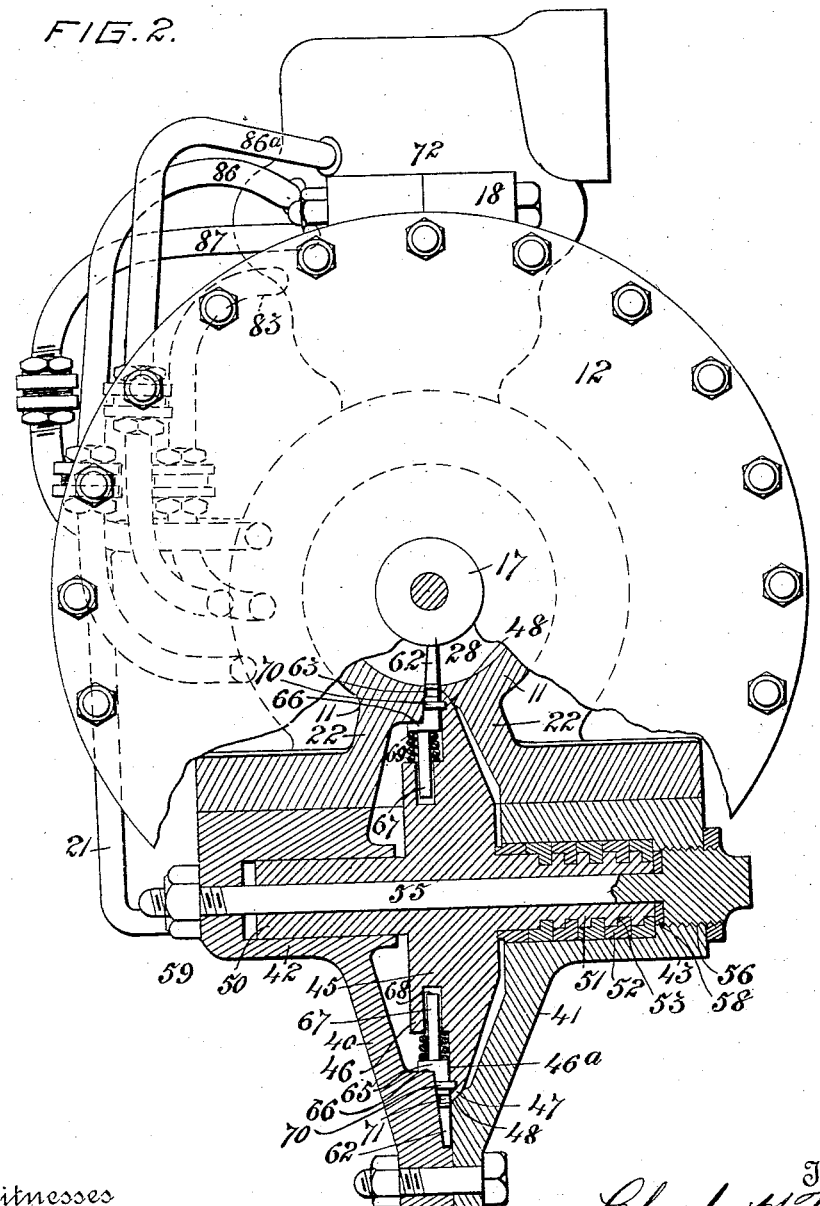

No. 711,083. Patented Oct. 14, 1902.
C. H. TAYLOR.
ROTARY ENGINE.
(Application filed Nov. 14, 1898.)
(No Model.) 6 Sheets—Sheet 3.
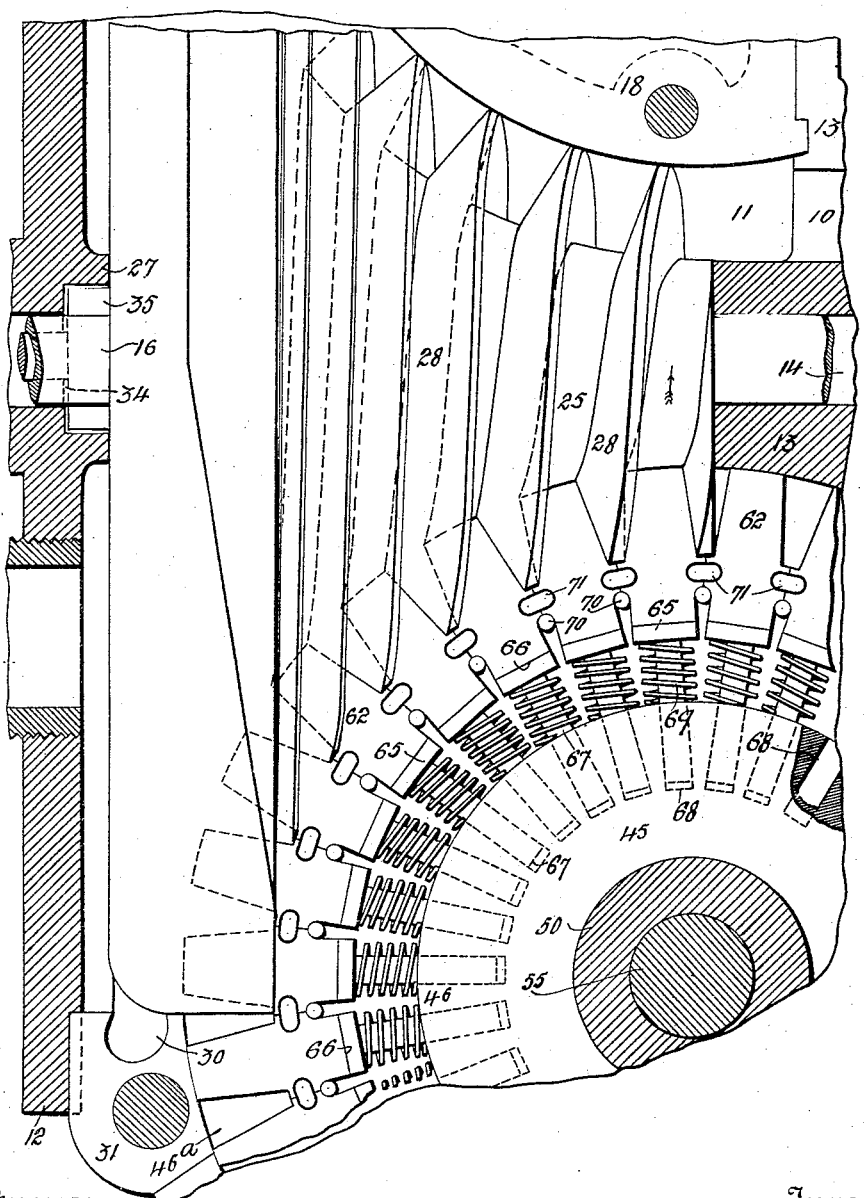

No. 711,083. Patented Oct. 14, 1902.
C. H. TAYLOR.
ROTARY ENGINE.
(Application filed Nov. 14, 1898.)
(No Model.) 6 Sheets—Sheet 4.
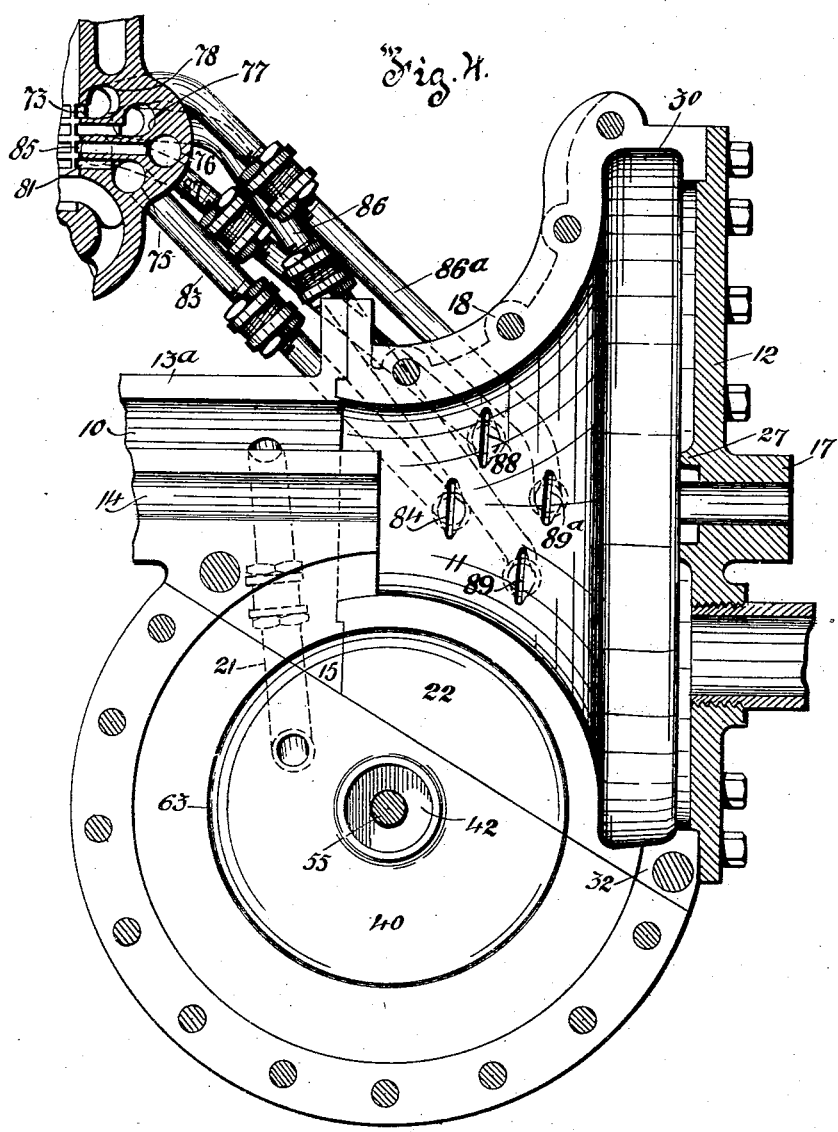

No. 711,083. Patented Oct. 14, 1902.
C. H. TAYLOR.
ROTARY ENGINE.
(Application filed Nov. 14, 1898.)

(No Model.) 6 Sheets—Sheet 5.

Witnesses
R. A. Kimber
Fred Stearns

Inventor
Charles H. Taylor
By his Attorney
John N. Swan

No. 711,083. Patented Oct. 14, 1902.
C. H. TAYLOR.
ROTARY ENGINE.
(Application filed Nov. 14, 1898.)

(No Model.) 6 Sheets—Sheet 6.

Witnesses
R.a.c. Kimber

Inventor
Charles H. Taylor
By his Attorney

THE NORRIS PETERS CO., PHOTO-LITHO., WASHINGTON, D. C.

United States Patent Office.

CHARLES HAVELOCK TAYLOR, OF MONTREAL, CANADA.

ROTARY ENGINE.

SPECIFICATION forming part of Letters Patent No. 711,083, dated October 14, 1902.

Application filed November 14, 1898. Serial No. 696,448. (No model.)

*To all whom it may concern:*

Be it known that I, CHARLES HAVELOCK TAYLOR, of the city of Montreal, Province of Quebec, Canada, have invented certain new and useful Improvements in Rotary Engines; and I do hereby declare that the following is a full, clear, and exact description of the same.

The object of my invention is to provide an engine that will utilize the fluid employed to the fullest extent of its power of thrust and expansion and the action whereof will be uniformly balanced.

To these ends the invention may be said, broadly, to consist of a series of chambers operatively connected to the part to be driven and located within a cylinder, said series of chambers being of increasing capacity from the fluid intake-port of the cylinder to the exhaust-port thereof, while means are provided to cause the fluid during its expansion to pass successively through said chambers and in doing so act upon the forward wall of each thereof and cause same to impart motion to the part to be driven, the extent of expansion to which it may be necessary to subject the fluid in order to maintain uniform velocity with a varying resistance being determined by an automatically-operated governor of novel construction.

The preferred embodiment of my invention may be said to consist in mounting a shaft with a portion thereof extending through a cylinder and securing thereto a spiral vane extending continuously from end to end of the portion of said shaft within said cylinder. The surface of this shaft is of concavo-conoidal form, with the apex toward the intake-port of the cylinder, and the cylinder conforms to the periphery of said spiral vane, which is of uniform pitch and width throughout. The continuous spiral chamber formed by this vane, the shaft, and the interior of the cylinder is divided radially and axially of the shaft into a series of spiral chambers by a series of resistance-heads in the form of tapered diaphragms carried yieldingly upon the periphery of a disk or hub rotatably mounted upon an axis located at a point concentric of the arc of the concavity of the conoidal shaft-surface. This hub and the resistance-heads carried thereby are located within a box secured to the cylinder, the resistance-heads projecting through an opening in the side of said cylinder and fitting into the spaces between the convolutions of the vane, while the interior of the box is cut off from the interior of the cylinder by steam-packing and the close fitting of the parts, the taper of the resistance-heads corresponding to one another and to the pitch of the vane.

My improved governor consists of a valve-chamber communicating at points intermediate of its ends with the interior of the cylinder at a number of different points in the length of said cylinder by a number of independent steam-ducts, while one end of said valve-chamber is connected to the steam-supply and the other end to the steam-intake port of the cylinder. The valve is normally free of the ducts and the passage to the intake-port and is preferably of hollow cylindrical form to allow the steam to pass therethrough to either said steam-intake port only or to said port and one or more of the ducts, according as the resistance to the engine increases. The valve is operated by a stem which extends therefrom to the exterior of the valve-casing, where it is operatively connected to governor-balls actuated, as usual, from any preferred driven part of the engine.

For full comprehension, however, of my invention reference must be had to the accompanying drawings, forming a part of this specification, in which like symbols indicate the same parts, and wherein—

Figure 6:
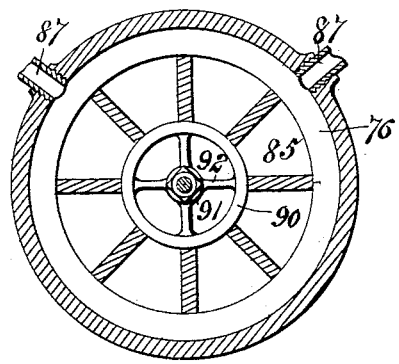
Figure 7:
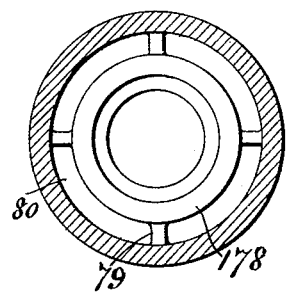
Figure 5:
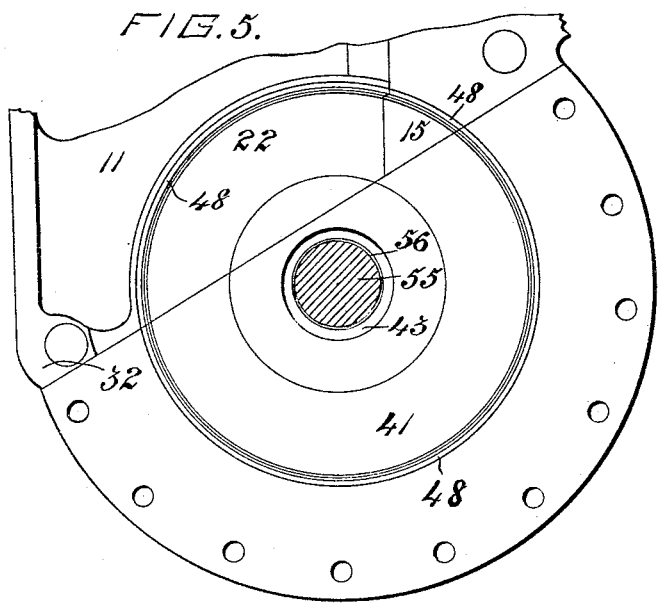
Figure 8:
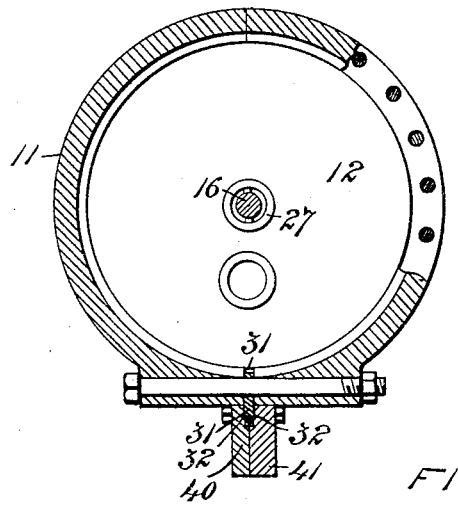
Figure 9:
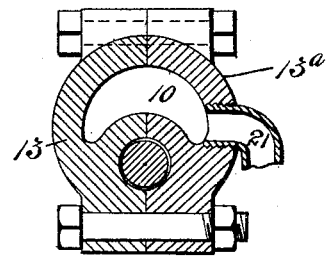
Figure 10:
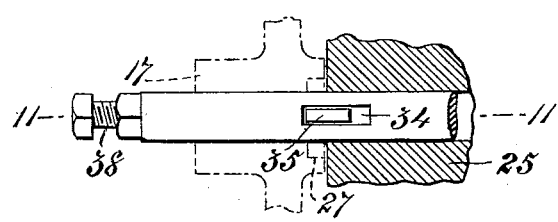
Figure 11:
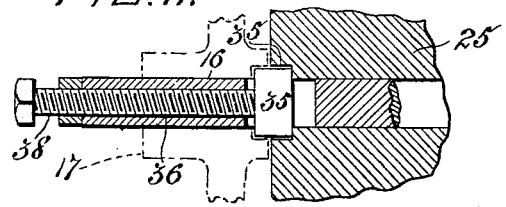

Figure 1 is a side elevation and part vertical sectional view of the internal parts of my improved rotary engine, the casing being partly in section to expose said parts; Fig. 2, an end elevation, partly in section, of my improved engine, the sectional view being taken on line 2 2, Fig. 1; Fig. 3, a side elevation of the internal parts of left-hand portion of my improved engine looking at Fig. 1. Fig. 4 is a detail plan view of the interior of the left-hand portion of the engine looking at Fig. 2; Fig. 5, a similar view of the right-hand portion; Figs. 6 and 7, horizontal sectional views of the governor, taken on lines 6 6 and 7 7, respectively, Fig. 1; Fig. 8, a vertical sectional view taken on line 8 8, Fig. 1. Fig. 9 is a transverse vertical sectional view of the main feed, taken on line 9 9, Fig. 1. Fig. 10 is a detail plan of one end of the shaft, illustrating my improved adjustable key; and Fig. 11 is a detail longitudinal sectional view thereof, taken on line 11 11, Fig. 10.

My improved engine preferably comprises two cylinder-casings 11 11, closed at their opposite ends by circular cylinder-heads 12 12, bolted thereto and connected together at their adjacent ends by a central connecting portion having a T-channel 10 formed therein at the upper side thereof. This central portion is preferably made in two longitudinal sections 13 and 13ª and is bored longitudinally thereof and concentrically of the cylinders, as at 14, to accommodate and form a bearing for the central portion of a horizontal shaft 16, which passes therethrough and through the cylinders and the cylinder-heads, which latter are formed concentrically thereof with journal-bearings 17 for the ends of said shaft. These cylinder-casings are divided vertically in an axial plane, the adjoining upper edges being radially flanged and bolted together, as at 18, while the lower portions thereof are downwardly extended and inclined away from one another to form wings 22, the edges whereof are flanged, as at 20, and the opening between these wings being continued for a short distance into the central connecting portion, as at 15, and communicates through a pipe 21 with the steam-supply T-channel. A conoidal hub 25, having a concave peripheral surface, is mounted rigidly upon the shaft 16 within each cylinder, with their truncated apices toward one another, said hubs extending from the central connecting portion to a circular shoulder 27, formed upon the interior of each cylinder-head and concentrically of the shaft. Upon the surface of these respective hubs are formed right and left hand spiral vanes 28 of uniform pitch and width throughout and extending the full length of said hubs, while the interior of the cylinder-casings are convexly conoidal in form to conform to and fit closely the periphery of said vanes. The outer portion of each cylinder-casing is increased in diameter, as at 30, to extend the space between the largest and second to largest convolution of the vane and connect said space with the space established by the shoulder 27 between the outer end of the hub and the interior of the cylinder-head, while a centripetally-extended plate 31 is secured between the halves within a space formed by a recess 32 in each half and is adapted to closely fit the periphery of the outermost convolution of the vane. The hubs are keyed to the shaft and the keys rendered adjustable to take up wear in the following manner, reference being had to Figs. 1, 3, 8, 10, and 11: The outer end of each hub is slotted radially for a short distance on the opposite sides of the shaft, as at 33, and the shaft is longitudinally slotted, as at 34. The slot 34 adjacent to the end of the shaft extends inwardly to a point inside of the slot in the hub, and keys 35, equal in width to the distance between the outer ends of the slots 34 and the inner sides of the slots 33, extend through said slots 34 and into the said slots 33.

The end of the shaft 16 is provided with a longitudinal screw-threaded boring 36, which intersects the slot 34 and receives a screw-bolt 38, having its outer ends formed with a squared head and its inner ends bearing upon the key. (See particularly Fig. 11.) It is obvious that if either the slots 33 should wear large or the keys narrow such wear can be readily taken up by the screw-bolt 38, which upon being screwed into the end of the shaft will force the left-hand key into its slot 33 and through the shaft draw the right-hand key into its slot 33.

A pair of approximately semicircular boxes are each formed, preferably, of two concavo-convex parts 40 and 41, formed concentrically of the exterior thereof with axially-projecting sleeves 42 and 43, respectively. The curved portion of the peripheries of the parts of each box are bolted together, and the plane portions thereof are provided with flanges through which they are bolted to the flanges 20 of the cylinder-casings. The sleeve 42 has its outer end closed and perforated to allow one end of a spindle 55, to be presently described, to pass therethrough, while the outer end of sleeve 43 is open and the interior thereof screw-threaded for a short distance. Within each of these boxes is located a disk 45, having one side cut away to form a hub 46 and flat bearing portion 46ª, and its other side beveled, as at 47, to allow the edge thereof to rest upon a correspondingly-beveled circular shoulder 48, formed partially on the interior of the part 41 of each box and partially on the interior of the adjoining wing 22. These disks are formed concentrically thereof with oppositely-extending sleeves 50 and 51, adapted to take into and bear, respectively, in the sleeves 42 and 43, the sleeve 50 being shorter than its inclosing sleeve 42, while the interior of the sleeve 43 is cored out from its inner end to within a short distance of the screw-threaded outer end thereof to accommodate a series of rings 52 of L shape in cross-section. The vertical portion of these rings take into a series of circular grooves 53, cut in the exterior surface of the sleeve 51, and the horizontal portions thereof inclose said sleeve 51. A spindle 55, before mentioned, extends through each disk 45 and the sleeves 50 and 51 and has its outer end screw-threaded, as at 56, to take into the screw-threaded end of the sleeve 43. The portion 57 of the spindle immediately adjacent to the screw-threaded portion is diminished in circumference and not screw-threaded, and a loose washer 58 is located between it and the adjacent end of the sleeve 51 and the outermost ring 52. The main length of the spindle is turned down to (as just mentioned) take through the disk 45 and sleeves 50 and 51, while its end projects through the perforation in the closed end of sleeve 42 and is screw-threaded to receive a jam-nut 59, between which and the outer face of such closed end of the sleeve a steam-packing may be located, if desired, although none is shown. The series of rings 52 serve as an effective steam-packing for that end of the sleeve, and the wear thereto is taken up and their close contact with one another effected by screwing the enlarged end of the spindle into its seat, the jam-nut 59 serving to retain the parts in position. Each of these disks 45 carries a series of resistance-heads each consisting of a diaphragm 62, having its side edges tapered to conform to the pitch of the vane 28 and completely fill the space between any two convolutions thereof, while one face is flat and rests upon the bearing portion 46ª and the other face beveled to correspond to a beveled curved shoulder 63, formed upon the interior of the line of juncture of the cylinder with the wing 22 adjacent thereto. This construction of the diaphragms imparts to each thereof the form of a wedge the faces whereof are adapted to establish a steam-tight joint between said diaphragm 62 and said shoulder 63, and the flat bearing-surface 46ª and between the latter and the shoulder 48, while the edges are adapted to establish a steam-tight joint between the front and side edges thereof, respectively, and the hub and the adjacent convolutions of the vane. In order to take up the wear between these parts and at the same time provide means to connect the resistance-heads to the hub portions 46 of the disks, I construct each with a heel 65, offset therefrom to provide a shoulder 66, the forward face whereof will bear upon the shoulder 63, and thus diminish the thrust upon the beforementioned steam-tight faces. A plug 67 is formed in one with each of said heels 65, and the free ends thereof take into a series of radial sockets 68, formed in the periphery of said hub, while a series of coiled springs 69 encircle said plugs and bear between said heels 65 and the face of the hub.

The resistance-heads are kept from swaying by a series of pins 70, carried rigidly by the bearing-surface 46ª and located so as to project between said heads, which are diminished to accommodate them, and in order to maintain a steam-tight connection between the heads the adjacent edges thereof are notched to accommodate a series of preferably oval packing-plugs 71, while said heads are prevented from radial displacement into the steam-spaces at the outer ends of the cylinders by the centripetally-extending portions 31 within said cylinders.

It is obvious that the resistance-heads separate the continuous spiral chamber formed by said vane, the interior of the cylinder, and the hub into a series of spiral subchambers, each inclosed by two complete adjoining convolutions of the vane, two adjoining resistance-heads, the adjoining portion of the interior of the casing, and the adjoining portion of the hub.

When the steam or other power containing medium is admitted to the first subchamber, it will naturally act in its expansion upon all the confining-walls thereof, and as the wall of greatest resistance is the face of the larger convolution greater power will be exerted upon it than upon any of the other walls, and consequently this wall may be considered the piston-face of the chamber. The excess of pressure upon the piston-face of this first chamber will, owing to its spiral formation, cause the hub, and with it the shaft, to rotate (in the direction indicated in Fig. 3) and in each complete revolution cause each resistance-head to move (through intermeshing with the same) forward along the vane and the convex face of the hub from the position of the first intermeshing head to the position of the head next to it in the line of progression, and so on, thus causing the body of steam in the first chamber to pass into the second chamber and in a like manner be conducted from chamber to chamber until it reaches the exhaust-port. In so doing it will have traveled consecutively through the chambers from that of the minimum expansion area to that of the maximum expansion area. Simultaneously with this action each revolution of the spiral vane will cut a fresh body of steam into the first chamber, which will follow the preceding body, and thus maintain a uniformly-balanced action.

In order to vary the power to compensate varying resistance to the engine and maintain a constantly-uniform velocity, I provide an automatically-actuated governor adapted to control the supply of steam and direct same to expansion-chambers of different area in the engine. This governor consists of a casing 72, formed with a vertical cylindrical valve-chamber 73 in the interior thereof and a horizontal passage 74, communicating with the upper end of said valve-chamber. The main portion of this casing is of a spherical form and has a series of preferably four horizontally-arranged circular channels 75, 76, 77, and 78, respectively, formed therein intermediate of the valve-chamber and the exterior of the casing. A tray 78ª is supported by bracket-arms 79 a short distance beneath said valve-chamber and forms a circular passage 80, leading therefrom to the steam-exit port of the casing, which is in turn connected to the vertical arm of the T steam-channel of the engine. The channel 75 is connected on its inside by a series of centripetal passages 81 to the interior of the valve-chamber 73 and on its outside by a pair of radial and downwardly-inclined pipes 83, communicating with a pair of spiral slots 84 in the respective cylinder-casings of the engine, said slots corresponding in pitch to that of the vanes and located, preferably, to communicate with the second subchamber of each engine. The channel 76 is connected similarly to the channel 75, to the valve-chamber by a series of centripetal passages 85, and through radial pipes 87 to a pair of spiral slots 88, similar to the slots 84, but communicating with the third subchamber of each cylinder-casing. The channels 77 and 78 are also similarly connected to the valve-chamber 73 and to the cylinder-casings through pipes 86 and 86ª and spiral slots 89 and 89ª to the fourth and fifth subchambers of the cylinders of the engine. The valve 90 is of hollow cylindrical form and has a hub 91 connected thereto by radial arms 92. This hub is connected to the lower end of the valve-stem 93, which extends upwardly through a perforation carrying a stuffing-box 94 in the top of the casing, and the upper end of the stem is formed at its upper end with a series of parallel grooves, constituting a rack 95. The portion of the stem adjacent to said racks is guided in a rotatable bracket 96, in the upper portion of which a pair of gear-toothed segments 97 are pivoted and adapted to intermesh with said racks. A pair of rods 98 are rigidly connected at their inner ends to said segments 97 and at their outer ends to a pair of governor-balls 99, while the stem is operatively connected, as usual, to any preferred driven part of the engine by a belt and pulley 100, rigidly mounted upon the lower end of a sleeve 101, formed integrally with said rotatable bracket. The operation of this governor is as follows: The steam will normally pass into the casing and through the valve-chamber and valve and all the channels and passages thereof, the casing, and the T-channel to the engine, the cylinders of which it will supply at several different points, as just described. If the resistance to be overcome by the engine should happen to be light, the velocity thereof will naturally, as in all engines, be too high, and consequently the governor-balls will during action by centrifugal force raise the outer ends of the rods 98 and through the segments and racks lower the valve and cut off the supply of steam admitted through channel 78 and slots 89ª to the cylinders. If the velocity still continues to be too high, the steam supplied through the channel 77 will be cut off, and, continuing to be excessive, the supply through channels 75 and 76, or, if necessary, the complete supply, cut off, as shown in full lines in Fig. 1. On the other hand, when the resistance to the engine increases and the velocity consequently slackens under a diminished supply the supply will be increased in a manner the reverse of that just described by which the supply is reduced, thus providing means that will (within of course the capacity of the engine) compensate any variance of resistance to this type of engine. The increased power attendant upon an increased supply of steam is utilized by causing said power to be, as is obvious, exerted upon an increased piston area, and vice versa. For instance, if the steam be admitted only through circular passage 80 it will act directly only upon the area of the first convolution of the spiral piston and during the rotation of the piston by expansion upon the remainder of the piston area, while if admitted through channel 75 it will act simultaneously directly upon the piston area of the first and second subchambers. The area of the piston-face of the second subchamber, as is obvious, exceeds the area of the piston-face of the first chamber. If admitted through channel 76, it will act simultaneously directly upon the piston area of the first, second, and third subchambers, and, as is also obvious, the area of the piston-face of this chamber exceeds the area of the piston-face of said second subchamber, and if admitted through channel 77 to the fourth subchamber it will be caused to act simultaneously upon piston-faces of even greater area, thus (by equalizing the steam-supply to the resistance) maintaining a constant pressure throughout all the subchambers to which the steam is directly supplied.

It is obvious that under certain conditions one hub and its vane and attendant parts can be utilized without departing from the spirit of my invention; but I have discovered the power of back thrust in that case to be excessive and detrimental to the utility and endurance of the engine, and I therefore employ two and adapt them by reversing the spiral of their vanes to each compensate the undesirable thrust power of the other. Furthermore, the resistance-heads can be mounted otherwise than as shown and the construction of the engine itself changed to a considerable extent without departing from the spirit of my invention, provided the main features be retained of constructing a rotary engine to encircle a series of spiral chambers of progressively-increasing area from the motive-fluid-intake port to the exhaust-port.

What I claim is as follows:

1. In a rotary engine, the combination with a cylinder and a part to be driven, of means for forming a series of spiral chambers within said cylinder; means for operatively connecting said chambers to the part to be driven; said spiral chambers being of increasing capacity from one end thereof to the other; means for supplying an expansible fluid direct to several of said chambers; means for automatically decreasing or increasing the number of said supplies, and means for causing said fluid to pass successively through all of said chambers, for the purpose set forth.

2. In a rotary engine, a cylinder, a spiral piston located within said cylinder and increasing in diameter from one end to the other; said cylinder closely fitting the periphery of said piston; an exhaust-port from said cylinder at the end of greatest diameter; means for supplying steam to said cylinder at points of different diameter along said spiral piston; and means for automatically decreasing or increasing the number of points to which steam is supplied, for the purpose set forth.

3. In a rotary engine a cylinder; a shaft extending through said cylinder; a spiral vane formed integrally with and entwined about said shaft from end to end of the portion thereof within said cylinder; said cylinder corresponding in form to and fitting closely the periphery of said vane; supply and exhaust ports to and from said cylinder and located respectively at the opposite ends thereof; the spiral space formed by said vane, the surface of said shaft, and the inside face of said cylinder, increasing in capacity from the supply end to the exhaust end thereof; a series of diaphragms adapted to intermesh with said vane and completely bisect the spaces between the convolutions thereof; means for carrying said diaphragm and means for causing same to travel axially of said shaft during the revolution thereof, for the purpose set forth.

4. In a rotary engine, a cylinder; a concavo-conoidal shaft extending through said cylinder; a spiral vane formed integrally with and entwined about said shaft from end to end of the portion thereof within said cylinder; said cylinder corresponding in form to and fitting closely the periphery of said vane; supply and exhaust ports to and from said cylinder and located respectively at the ends of minimum and maximum diameter thereof; a circular box extending laterally in an axial plane from said cylinder; a hub mounted rotatably within said box; a series of diaphragms adapted to completely bisect the spaces between the convolutions of said vane, and means for yieldingly connecting said diaphragms radially to the periphery of said hub; and means for packing the line of juncture of said box and cylinder and the points at which said diaphragms intersect said line of juncture, for the purpose set forth.

5. In a rotary engine, a cylinder; a concavo-conoidal shaft extending through said cylinder; a spiral vane formed integrally with and entwined about said shaft from end to end of the portion thereof within said cylinder; said cylinder corresponding in form to and fitting closely the periphery of said vane; supply and exhaust ports to and from said cylinder and located respectively at the ends of minimum and maximum diameter thereof; a circular box extending laterally in an axial plane from said cylinder; a hub mounted rotatably within said box and having a series of radial borings formed in the periphery thereof; a series of tapered wedge-shaped resistance-heads 62 each formed with a plug 67 adapted to take into said borings, said resistance-heads being adapted to completely bisect the space between the pair of convolutions adjacent thereto of the vane; a series of coiled springs adapted to take over said plugs and bear between said resistance-heads and the hub; and means for packing the line of juncture of said box and cylinder and the points at which said diaphragms intersect said line of juncture, for the purpose set forth.

6. In a rotary engine, a cylinder; a concavo-conoidal shaft extending through said cylinder; a spiral vane formed integrally with and entwined about said shaft from end to end of the portion thereof within said cylinder; said cylinder corresponding in form to and fitting closely the periphery of said vane; supply and exhaust ports to and from said cylinder and located respectively at the ends of minimum and maximum diameter thereof; a circular box extending laterally in an axial plane from said cylinder; a pair of sleeves formed in one with and extending axially in opposite directions from the exterior of said box; a hub mounted rotatably within said box and having a series of radial borings formed in the periphery thereof; a series of tapered wedge-shaped resistance-heads 62 each formed with a plug 67 adapted to take into said borings, said resistance-heads being adapted to completely bisect the space between the pair of convolutions adjacent thereto of the vane; a series of coiled springs adapted to take over said plugs and bear between said resistance-heads and the hub; a series of packing-pins located in registering grooves in the adjoining edges of said resistance-heads; a pair of pins located respectively in contact with each side edge of each head; said hub being formed with oppositely-extending sleeves, adapted to take into said before-mentioned sleeves; a spindle passing through said sleeves and enlarged and screw-threaded at one end to take into the screw-threaded interior of one end of the outer sleeves; the exterior of the adjacent inner sleeve being circumferentially grooved; and a series of packing-rings L-shaped in cross-section encircling said sleeve and taking into the grooves thereof, substantially as described and for the purpose set forth.

7. In a rotary engine, a cylinder; a concavo-conoidal shaft extending through said cylinder; a spiral vane formed integrally with and entwined about said shaft from end to end of the portion thereof within said cylinder; said cylinder corresponding in form to and fitting closely the periphery of said vane, substantially as described.

In testimony whereof I have affixed my signature in presence of two witnesses.

CHARLES HAVELOCK TAYLOR.

Witnesses:
WILLIAM P. McFEAT,
FRED. J. SEARS.